United States Patent [19]

Wright

[11] Patent Number: 5,293,605
[45] Date of Patent: Mar. 8, 1994

[54] APPARATUS TO SUPPLEMENT CACHE CONTROLLER FUNCTIONALITY IN A MEMORY STORE AND A CACHE MEMORY

[75] Inventor: David P. Wright, Birmingham, England

[73] Assignee: Mitsubishi Denki Kabushiki Kaisha, Tokyo, Japan

[21] Appl. No.: 663,872

[22] PCT Filed: Jul. 5, 1990

[86] PCT No.: PCT/GB90/01037

§ 371 Date: Mar. 4, 1991

§ 102(e) Date: Mar. 4, 1991

[87] PCT Pub. No.: WO91/00571

PCT Pub. Date: Jan. 10, 1991

[30] Foreign Application Priority Data

Jul. 5, 1989 [GB] United Kingdom ............... 8915422

[51] Int. Cl.[5] .......................................... G06F 12/00
[52] U.S. Cl. ......................... 395/425; 364/DIG. 1; 364/243.41; 364/260
[58] Field of Search ........................... 395/425, 500

[56] References Cited

U.S. PATENT DOCUMENTS 4,816,997 3/1989 Scales, III et al. ............... 395/325
5,131,083 7/1992 Crawford et al. ............. 364/DIG. 1
5,146,582 9/1992 Begun ............................. 395/500

OTHER PUBLICATIONS

Wescon 1987, Conference Record, vol. 31, 1987, S. R. Williams et al.: "The NEC μPD71641 Cache Memory Controller", Session 7/2, pp. 1-5.
Electronics & Wireless World, vol 95, No. 1635, Jan. 1989, I. Wilson: "Cacheing in the Chips", pp. 75-77.
Elektronik, vol 38, No. 8, 14 Apr. 1989, J. Bodenkamp: "Der 80486: Cache und Coprozessor mit Integriert", pp. 50-60.
Computer Design, vol. 28, No. 21, 1 Nov. 1989, J. Bond: "Cache Controller Chips Erase PC Performance Bottleneck", pp. 32, 34.

Primary Examiner—David L. Robertson
Attorney, Agent, or Firm—Wolf, Greenfield & Sacks

[57] ABSTRACT

A computer comprises a CPU (11), a memory store (12) and a cache comprising a cache memory (17) and a cache controller (16), the CPU (11) being capable of receiving from a memory store (12), or from the cache memory (17), elements of data each arranged as a plurality of words of data associated with a common address, the cache controller (16) inherently only being capable of handling elements of data arranged as a single word of data and an associated address, there being provided a state machine to enable the cache controller (16) to handle elements of data each arranged as a plurality of words of data associated with a common address.

20 Claims, 2 Drawing Sheets

APPARATUS TO SUPPLEMENT CACHE CONTROLLER FUNCTIONALITY IN A MEMORY STORE AND A CACHE MEMORY

FIELD OF THE INVENTION

This invention relates to a computer having what is known as a cache.

Conventionally a cache comprises a random access memory or RAM which can be accessed much faster than a main memory store of the computer.

A cache controller monitors calls from the main, or central processing unit (hereinafter called a "CPU") for data and if the cache controller recognises that the requested data is available in the cache RAM memory, the cache memory sends the data direct to the CPU.

In the event that the requested data is not present in the cache, the main memory store is accessed and the data accessed from the main memory store is fed to the CPU and the cache memory to replace data already in the cache memory or to add to it, depending on address location availability.

In a conventional computer, each element of data has an associated address by which the data element is identified. Where a cache is provided, the CPU is capable of receiving from the main memory store and from the cache memory, elements of data arranged as a single word of data and an associated address. Similarly, the cache controller is capable of handling elements of data arranged as a single word of data and an associate address.

Much more powerful CPU's are now available which are capable of processing elements of data comprising a plurality of words of data each having a unique associated address, and memories are known which are capable of storing data elements in this form.

SUMMARY OF THE INVENTION

According to the invention, we provide a computer comprising a CPU, a memory store and a cache comprising a cache memory and a cache controller, the CPU being capable of receiving from a memory store, or from the cache memory, elements of data each arranged as a plurality of words of data associated with a common address, the cache controller inherently only being capable of handling elements of data arranged as a single word of data and an associated address, there being provided a state machine to enable the cache controller to handle elements of data each arranged as a plurality of words of data associated with a common address.

Thus a cache can be used with a more powerful CPU/memory system without having to provide a cache controller which is inherently capable of handling elements of data each arranged as a plurality of words of data associated with a common address.

BRIEF DESCRIPTION OF THE DRAWING

The invention will now be described with reference to FIG. 1 which is a schematic diagram of a computer in accordance with the invention and to FIG. 2 which is a schematic diagram illustrating the association between data and address.

DETAILED DESCRIPTION

Figure 1:
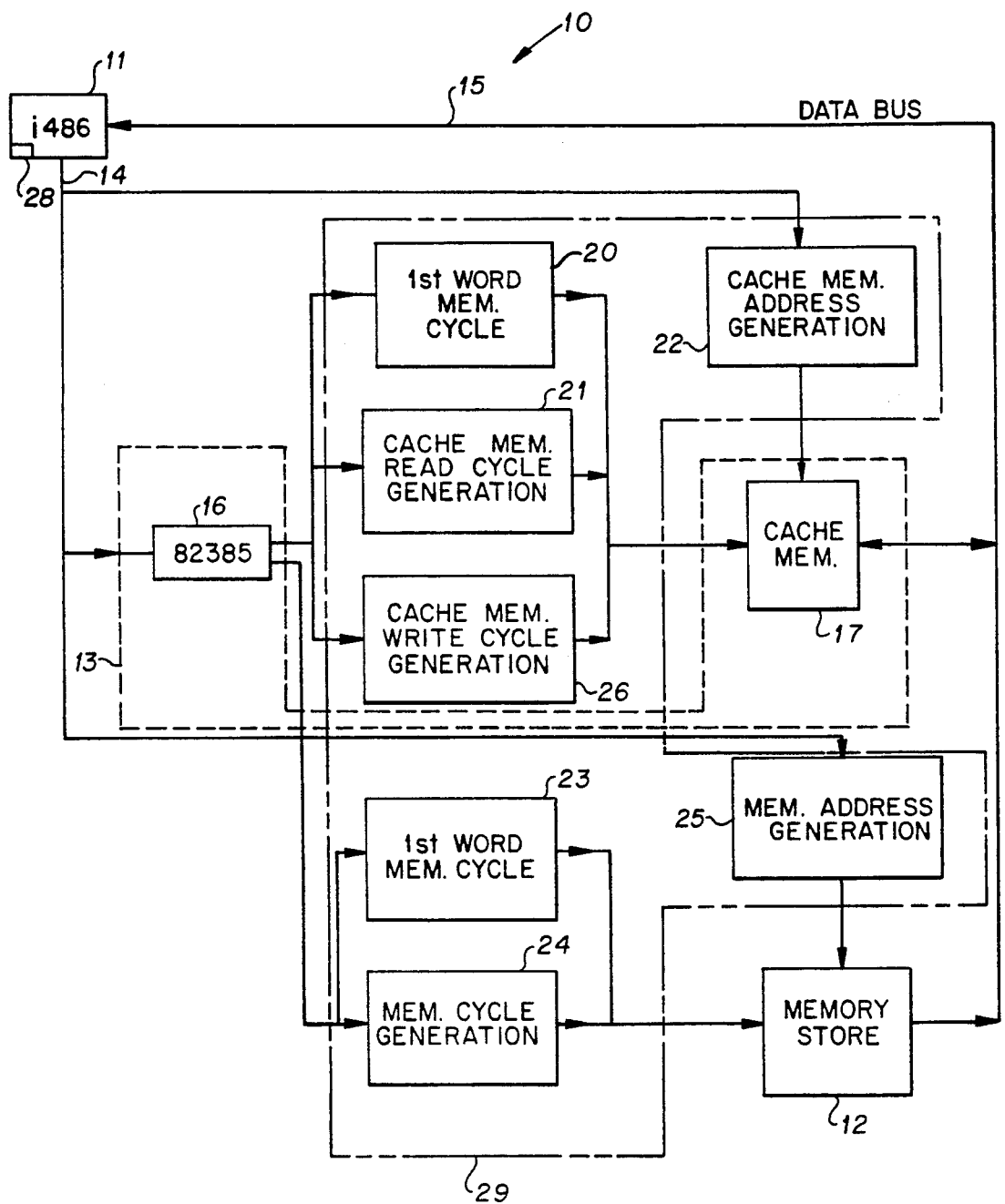
Figure 2:
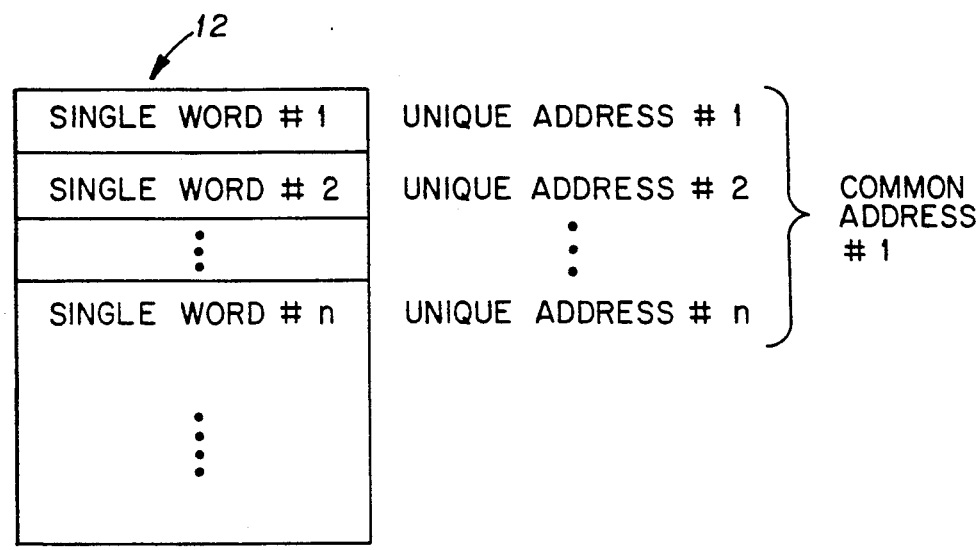

Referring to the drawing, there is shown a computer 10 comprising a main or central processing unit (CPU) 11 which in this specific example comprises an Intel i486 microprocessor, a memory store 12, which may be a main memory and/or an auxiliary memory and/or an expansion memory, and a cache 13.

An address bus 14 and a data bus 15 extend between the CPU 11, the main memory store 12, and the cache 13.

The cache 13 comprises a cache controller 16 which in this example comprises an Intel 82385 cache controller and a static random access memory or S.RAM 17.

A state machine 29 is provided which operates in conjunction with the cache controller 16 and the cache memory 17 and memory store 12 as hereinafter explained.

The cache controller 16 monitors the address bus 14 and in the event that the CPU 11 calls for data which is present in the cache memory 17, the cache controller 16 operates as hereinafter explained, to cause the called for data to be fed from the cache memory 17 to the data bus 15 direct to the CPU 11 where it is processed.

This way of retrieving data from the cache memory 17 is very fast compared with retrieving the data from the memory store 12. However, the content of the cache memory 17 is necessarily small.

In the event that the CPU 11 calls for data which is not present in the cache memory 17, the cache controller 16 causes the data to be retrieved directly from the memory store 12 as hereinafter explained, and fed to the CPU 11 along data bus 15, which is a slower method of retrieval.

When data has to be retrieved from the memory store 12, the cache controller 16 causes that data to be written into the cache memory 17, either to replace or to add to the data in the cache memory 17 depending on the availability of address locations in the cache memory 17.

In a conventional arrangement, the data which would be handled by the CPU 11 and cache controller 16, and is stored in the memory store 12 and the cache memory 17 is in the form of data elements arranged as a single word of data with a single associated address.

However, in accordance with the present invention, the processor providing the CPU 11 is capable of processing elements of data (in so called "burst" mode) each arranged as a plurality of words of data which each have a unique associated address, and the memory store 12 is also capable of storing data and providing data to be the data bus 15 in the form of elements of data each arranged as a plurality of words of data associated with a common address.

Furthermore, the cache memory 17 is capable of storing data and providing data to the CPU 11 in the form of elements of data arranged as a plurality of words of data each having an associated address.

In this example, the i486 microprocessor 11 which comprises the CPU 11 can handle up to four words of data of 32 bits each making a total of 128 bits of information each word having its own address and similarly the cache memory 17 and memory store 12 are able to store data elements arranged as four words of data.

However the 82385 cache controller 16 is inherently only able to handle elements of data arranged as a single word of 32 bits of data and an associated address.

Thus it will be appreciated that the cache controller 16 would inherently be unable to cause the four words of data of a data element to be read either from the cache memory 17 or the memory store 12.

In accordance with the present invention, the state machine cooperates with the cache controller 16 and the cache memory 17 any memory store 12 to enable the cache controller 16 to handle elements of data in the form of the plurality of words of data with a common address.

This is achieved as follows.

The plurality of words of data, although each word has a unique address, are all associated with the address of one of the words of data e.g. the first word of the data element.

Thus the state machine 29, when recognizing the address of a first word of a data element comprising a plurality of words, generates address information for the other words of the data element.

The cache controller 16, when recognizing the address of the first word of a called for data element, generates a read and/or write memory cycle for that word only, depending upon whether or not the word of the data element is present in the cache memory 17, whilst the state machine generates a read and/or write memory cycle for each of the other words of the data element.

Referring again to the drawing, in the event that the CPU 11 calls for a data element comprising a plurality of words of data and the cache controller 16 recognizes from the address of the first word, that the data element is present in the cache memory 17, the cache controller 16 generates a cache memory read cycle for the first word of the data element (indicated at item 20) whilst the state machine generates cache memory read cycles for each of the remainder of the words of data of the data element (indicated at item 21). In parallel with this, the state machine recognizes the address of the first word of the data element being called for and generates address information (at item 22) for the remainder of the words of data.

Hence all of the words of data of the data element called for by the CPU 11 are read from the cache memory 17 onto the data bus 15 and hence are received by the CPU 11.

In the event that the CPU calls for a data element comprising a plurality of words of data and the cache controller 16 recognizes from the address of the first word of the data element that the data element is not present in the cache memory 17, the cache controller generates for the memory store 12, a memory read cycle for the first word of the data element, (as indicated at item 23) whilst the state machine generates for the memory store 12, a memory read cycle for the remainder of the words of data of the data element being called for by the CPU. In parallel with this, the state machine in recognizing the address of the first word of the data element being called for, generates address information (at item 25) for the memory store 12, for each of the remainder of the words of data.

Hence all of the words of data of the data element called for by the CPU 11 are read from the memory store 12 on to the data bus 15 and hence are received by the CPU 11.

Furthermore, in this latter case, where the data element being called for by the CPU 11 is not present in the cache memory 17, the cache controller 16 generates a cache memory write cycle (again indicated at item 20) for the first word of the data element, whilst the state machine generates a cache memory write cycle for the remainder of the words of data of the data element being called for (indicated at item 26). In parallel with this, the state machine recognizing the address of the first word of the data element being called for generates address information (again at item 22) for the remainder of the words of data.

Hence the data element being read from the memory store 12 by the CPU 11, is also written into the cache memory 17 either to replace a data element already present in the cache memory 17, or to add to the data present in the cache memory 17, depending upon the availability of address locations.

Thus it will be appreciated that in effect, the state machine 29 blinds the cache controller 16 to words of data in each data element following the first word of the data element.

Thus the cache controller 16 handles each element of data as if it were a single word of data and a common address. The cache controller 16 is only aware of one word of data being transferred from the memory store 12 or cache memory 17 to the data bus 15, and from the data bus 15 to the cache memory 17.

Thus there is no need to provide a cache controller which is inherently capable of handling elements of data in the form of a plurality of words of data and a common address.

Utilizing the invention, with a suitable state machine, the Intel 82385 cache controller 16 would be able to handle elements of data in the form of any number of words of data each associated with a common address, and is not restricted to handling elements of data arranged as four words of data and a common address, which in the example described, the i486 processor providing the CPU 11 can handle.

In the present example, the 486 processor has its own internal built-in cache indicated at 28, which has a small memory able to store elements of data in the form of four words of data associated with a common address.

Thus when the processing function of the CPU 11 calls for data, this may be present either in its own internal cache 28, which would obviously provide the most rapid retrieval, and/or in the cache memory 17 of the cache. Only if the requested data is not present in either of these cache memories does the data need to be retrieved from the memory store 12.

The content of the memory of the cache internal 28 of the CPU 11 may be replaced by data either from the memory cache 17 of the cache 13, or from the memory store 12 as desired.

Of course, with a different CPU 11 which is able to handle and process elements of data or with more or less than four words of data associated with a common address, the cache memory 17 and main memory 12 may need to be adapted to accommodate this.

The features disclosed in the foregoing description, the following claims or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

What is claimed is:

1. A computer comprising a CPU, a memory store connected to a data bus, and a cache comprising a cache memory connected to the data bus and a cache controller, the cache memory and the memory store both being organized and arranged to store a plurality of multiword data elements, each multiword data element being comprised of a plurality of words of data associated with a common address, the CPU having means for receiving and transmitting multiword data elements on the data bus, the cache controller inherently limited to providing cache functionality for single word data elements only, the computer further comprising a state machine connected to the cache controller, the cache memory, and the memory store and having means for supplementing the cache controller to provide functionality for multiword data elements.

2. A computer according to claim 1 wherein each word of data of memory store has a unique address, and wherein each common address is also the unique address for a first word of the corresponding multiword data element, and wherein the state machine has means for recognizing the common addresses corresponding to the plurality of multiword data elements of the memory store and for generating address information for the remainder of words of the multiword data element.

3. A computer according to claim 2 wherein the state machine has means for generating a memory cycle for each word of the remainder of words of the multiword data element when the cache controller generates a memory cycle for the first word.

4. A computer according to claim 3 wherein the state machine has means for generating memory read cycles for each word of the remainder of words of the multiword data element when the cache controller generates a memory read cycle for the first word corresponding to a CPU request for data that is present only in the memory store, whereby the CPU receives the multiword data element from the memory store.

5. A computer according to claim 3 or claim 4 wherein the state machine has means for generating cache memory write cycles for each word of the remainder of words of the multiword data element when the cache controller generates a cache memory write cycle for the first word corresponding to a CPU request for data that is present only in the memory store, whereby the CPU receives the multiword data element from the memory store and the multiword data element is written into the cache memory.

6. A computer according to claim 5 wherein the state machine has means for generating cache memory read cycles for each word of the remainder of words of the multiword data element when the cache controller generates a cache memory read cycle for the first word corresponding to a CPU request for data that is present in the cache memory, whereby the CPU receives the multiword data element from the cache memory.

7. A computer according to claim 4 wherein the state machine has means for generating cache memory read cycles for each word of the remainder of words of the multiword data element when the cache controller generates a cache memory read cycle for the first word corresponding to a CPU request for data that is present in the cache memory, whereby the CPU receives the multiword data element from the cache memory.

8. A computer according to claim 3 wherein the state machine has means for generating cache memory read cycles for each word of the remainder of words of the multiword data element when the cache controller generates a cache memory read cycle for the first word corresponding to a CPU request for data that is present in the cache memory, whereby the CPU receives the multiword data element from the cache memory.

9. A computer according to claim 1 wherein the multiword data element is comprised of four words of data associated with a common address.

10. A computer according to claim 9 wherein each word of data comprises 32 bits of information.

11. A state machine to be used in a memory system comprising a memory store, a cache memory, and a cache controller, the memory store being comprised of a first plurality of multiword data elements and the cache memory being comprised of a second plurality of multiword data elements, the cache controller being inherently limited to providing cache functionality for single word data elements only, said state machine being connected to the cache controller, the cache memory, and the memory store, and having means for supplementing the cache controller to provide functionality for multiword data elements.

12. A state machine according to claim 11 wherein each multiword data element is comprised of a plurality of words associated with a common address, and wherein each common address is also the address for a first word of the corresponding multiword data element, and wherein the state machine has means for recognizing the common addresses corresponding to the first plurality of multiword data elements and for generating address information for the remainder of words of a multiword data element being requested from the memory store and the cache memory.

13. A state machine according to claim 12 wherein the state machine has means for generating a memory cycle for each word of the remainder of words of the multiword data element being requested when the cache controller generates a memory cycle for the first word.

14. A state machine according to claim 13 wherein the state machine has means for generating memory read cycles for each word of the remainder of words of the multiword data element being requested when the cache controller generates a memory read cycle for the first word corresponding to a request for data that is present only in the memory store.

15. A state machine according to claim 14 wherein the state machine has means for generating cache memory write cycles for each word of the remainder of words of the multiword data element being requested when the cache controller generates a cache memory write cycle for the first word corresponding to a request for data that is present only in the memory store.

16. A state machine according to claim 13 wherein the state machine has means for generating cache memory write cycles for each word of the remainder of words of the multiword data element being requested when the cache controller generates a cache memory write cycle for the first word corresponding to a request for data that is present only in the memory store.

17. A state machine according to claim 11 wherein the state machine has means for generating cache memory read cycles for each word of the remainder of words of the multiword data element being requested when the cache controller generates a cache memory read cycle for the first word corresponding to a request for data that is present in the cache memory.

18. A computer comprising a CPU, a memory store connected to a data bus, and a cache comprising a cache memory connected to the data bus and a cache controller, the cache memory and the memory store both being organized and arranged to store a plurality of multiword data elements, each multiword data element being comprised of a plurality of words of data associated with a common address, the CPU having means for receiving and transmitting multiword data elements on the data bus, the cache controller inherently limited to providing cache functionality for single word data elements only, the computer further comprising a state machine connected to the cache controller, the cache memory, and the memory store, said state machine having means for controlling the cache for a remainder of words of a multiword data element after the cache controller has provided functionality for a first word of the multiword data element.

19. A computer comprising:
- a memory store connected to a data bus, the memory store being organized and arranged to store a first plurality of multiword data elements, each multiword data element being comprised of a plurality of words of data associated with a common address;
- a cache comprising a cache memory connected to the data bus and a cache controller that provides control signals for single word data elements only, the cache memory being organized and arranged to store a second plurality of multiword data elements;
- a CPU, the CPU having means for receiving and transmitting multiword data elements on the data bus; and
- a state machine connected to the cache controller, the cache memory, and the memory store, the state machine having means, responsive to the control signals from the cache controller, for controlling the cache memory and the memory store for a remainder of words of a multiword data element after the cache controller has provided control signals for a first word of the multiword data element.

20. A state machine to be used in a memory system comprising a memory store, a cache memory, and a cache controller, the memory store being comprised of a first plurality of multiword data elements, the cache memory being comprised of a second plurality of multiword data elements, the cache controller providing control signals for single word data elements only, said state machine being connected to the cache controller, the cache memory, and the memory store, and having means, responsive to the control signals from the cache controller, for controlling the cache memory and the memory store for a remainder of words of a multiword data element after the cache controller has provided control signals for a first word of the multiword data element.

* * * * *